Jan. 9, 1962 W. HENDRICKSEN ETAL 3,016,462
MULTI-LAYER VESSEL HAVING A GAMMA RAY FLUX ABSORBING LAYER
Filed April 28, 1958 2 Sheets-Sheet 1

INVENTORS
WARREN HENDRICKSEN,
HOWARD H. NEEDHAM, DECEASED,
BY MARGARET NEEDHAM, EXECUTRIX

BY *Andrus & Starke*

Attorneys

Jan. 9, 1962 W. HENDRICKSEN ETAL 3,016,462
MULTI-LAYER VESSEL HAVING A GAMMA RAY FLUX ABSORBING LAYER
Filed April 28, 1958 2 Sheets-Sheet 2

γ RADIATION HEATING
At core horizontal midplane with
no thermal shield & thick reflector.

INVENTORS
WARREN HENDRICKSEN,
HOWARD H. NEEDHAM, DECEASED,
BY MARGARET NEEDHAM, EXECUTRIX

BY
Andrus & Starke
Attorneys 3,016,462
MULTI-LAYER VESSEL HAVING A GAMMA RAY FLUX ABSORBING LAYER
Warren Hendricksen, Milwaukee, Wis., and Howard H. Needham, deceased, late of Wauwatosa, Wis., by Margaret Needham, executrix, Wauwatosa, Wis., assignors to A. O. Smith Corporation, Milwaukee, Wis., a corporation of New York
Filed Apr. 28, 1958, Ser. No. 731,341
5 Claims. (Cl. 250—108)

This invention relates to a multi-layer vessel or container and more particularly to a multi-layer reactor pressure vessel used in nuclear service in which at least one of the layers is formed of a material having a high rate of absorption of gamma radiation.

In the conventional nuclear reactor, heavy shields are suspended within the reactor in spaced relation to the walls to absorb gamma rays and other radiation energy and protect the reactor pressure vessel walls from the temperature differences and the resulting thermal stresses which accompany the temperature differences. The use of shields within the reactor requires an intricate supporting structure and also adds to the overall size of the reactor.

The present invention is directed to a multi-layer reactor pressure vessel formed with a multi-layer construction in which a plurality of relatively thin metal layers are tightly disposed on one another in superimposed relation. To absorb the gamma radiation energy from the nuclear core contained within the vessel, a layer of material having a high rate of gamma radiation energy absorption is disposed between the layers of the reactor vessel wall and is in effect an integral part of the wall. The gamma radiation absorption layer is generally located adjacent a cooling surface or cooling passage so that heat generated by the absorption of the gamma radiation can be readily transferred to the cooling media and thereby reduce the thermal stresses within the vessel wall.

The gamma radiation absorbing layer which is incorporated within the multi-layer wall reduces the leakage of gamma ray radiation through the vessel wall and thereby minimizes the required internal and external shielding for the reactor. By reducing the shield requirements, the overall size of the reactor vessel can be reduced and the supporting structures necessary for the shielding can be minimized.

Other objects and advantages will appear in the course of the following description.

The drawing illustrates the best mode contemplated of carrying out the invention.

Figure 1:
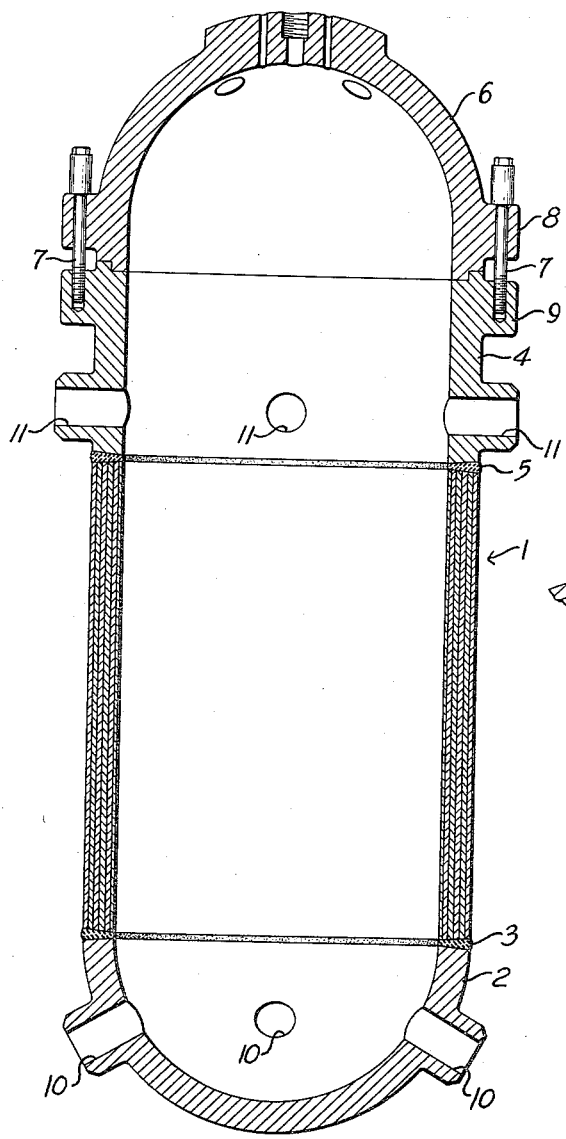
FIGURE 1 is a longitudinal section of a multi-layer nuclear reactor pressure vessel.

The drawings illustrate a nuclear reactor pressure vessel or the like and comprises a cylindrical shell 1 which is enclosed at its lower end by a general hemispherical head 2. The head 2 is secured to the lower end of the shell 1 by girth welds 3.

The upper end of shell 1 is secured to a cylindrical forging 4 by girth weld 5, and the upper end of forging 4 is closed off by a head 6. The head 6 is attached to the forging by bolts 7 which extend through suitable openings in the flange 8 of head 6 and are engaged within threaded openings in the matching flange 9 or forging 4. It is contemplated that the member 4 and heads 2 and 6 may be formed of multi-layer construction rather than solid forgings, as shown in the drawings.

A heat exchange medium such as water, which is adapted to absorb heat from the atomic core, is introduced into the reactor through a plurality of inlets 10 formed in lower head 2. The water is discharged from the reactor through outlets 11 formed in the forging 4.

Figure 2:
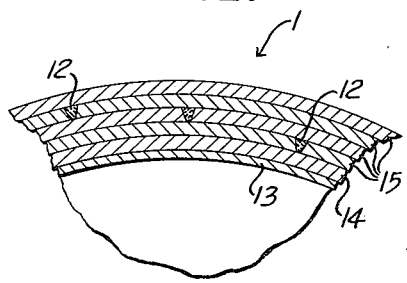
FIG. 2 is an enlarged fragmentary transverse section of the multi-layer vessel wall embodying the present invention.

As best shown in FIG. 2, the shell 1 is formed of a plurality of metal layers which are tightly disposed about one another. As shown in the drawings, the shell is formed of six layers, however, it is contemplated that any number of layers of various thicknesses may be employed depending upon the particular requirements of the reactor. Each of these layers are connected together along their longitudinal edges by longitudinal welds 12. The welds 12 are preferably staggered throughout the circumference of the shell.

The inner most layer 13 of shell 1 is preferably formed of or clad with a corrosion resistant material, such as stainless steel or the like in order to withstand corrosion by the heat exchange medium, such as water, passing within the reactor.

According to the invention, one or more of the intermediate layers are formed of a material having a high rate of absorption of gamma radiation. As shown in FIG. 2, the gamma ray flux absorbing layer is the second innermost layer 14 but it is contemplated that layer 14 may be disposed anywhere within the wall of the reactor but preferably adjacent the location of a cooling surface or medium. As shown in the drawing, the cooling water is circulated within the reactor and the layer 13 is in direct heat exchange relation with the water. The gamma radiation absorbing layer 14 is thus in proximate relation to the cooling medium flowing through the reactor.

The remaining outer layers 15 of the vessel wall, shown in the drawing, are formed of carbon steel or any other material having the mechanical properties necessary to withstand the temperature and pressure conditions encountered within the vessel in service. The gamma radiation absorbing layer 14 does not necessarily add strength to the vessel wall and it is contemplated that the layer 14 be of a material which will merely transmit pressure from the inner layer 11 to the outer layers 15.

The ability to absorb gamma radiation is approximately proportional to the density of the material so that a heavy material is most satisfactory for the layer 14. Generally, the layer 14 should have a density of over 8.0 grams per cubic centimeter and may take the form of any metal, alloy or compound having the above density.

For example, the following metals, or alloys or compounds of the following metals having the above mentioned density, may be employed as the layer 14, lead, cadmium, mercury, molybdenum and tungsten.

The multi-layer structure permits the gamma ray radiation flux absorbing layer 14 to be incorporated as an integral part of the vessel wall and yet the gamma radiation absorbing material will be out of contact with the water passing through the reactor and will not be subjected to corrosion by this water.

The gamma radiation absorbing layer 14 minimizes the leakage of gamma ray flux through the reactor vessel wall and also minimizes the amount of internal shielding that is required within the vessel. By minimizing the internal shielding, the need for shielding supports is reduced and the overall size of the reactor vessel can also be reduced.

Figure 3:
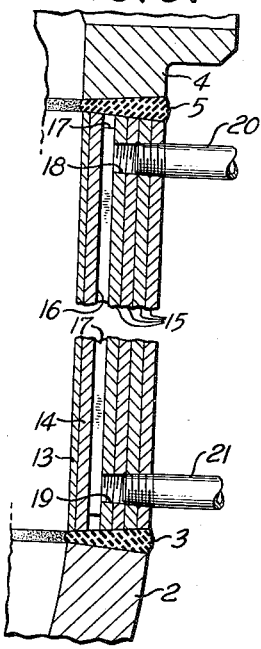
FIG. 3 is a fragmentary longitudinal section of a modified form of the invention in which cooling passages are incorporated within the vessel wall.
Figure 4:
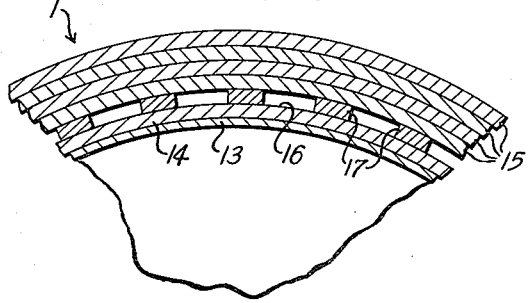
FIG. 4 is an enlarged fragmentary transverse section of the multi-layer vessel wall shown in FIG. 3.

FIGS. 3 and 4 show a modified form of the invention in which a series of cooling passages 16 are located outwardly adjacent the gamma radiation absorbing layer 14. The passages 16 are formed by inserting a series of spacer bars 17 between layer 14 and the adjacent layer 15. The bars 17 are disposed longitudinally of the shell in spaced circumferential relation.

Alternately, the passages 16 may be formed by making either layer 14 or the adjacent layer 15 of thicker dimension and machining grooves in the thicker layer to form the passages.

To introduce a cooling medium, such as water, into passages 16, the shell wall is provided with a pair of openings 18 and 19 which extend from the exterior of the shell inwardly to the passage 16. Suitable conduits 20 and 21 are threadedly engaged within each of the openings 18 and 19, respectively, and conduit 20 serves to conduct water from a source, not shown, to inlet opening 6 and conduit 21 serves to discharge the water from the outlet opening 19.

Figure 5:
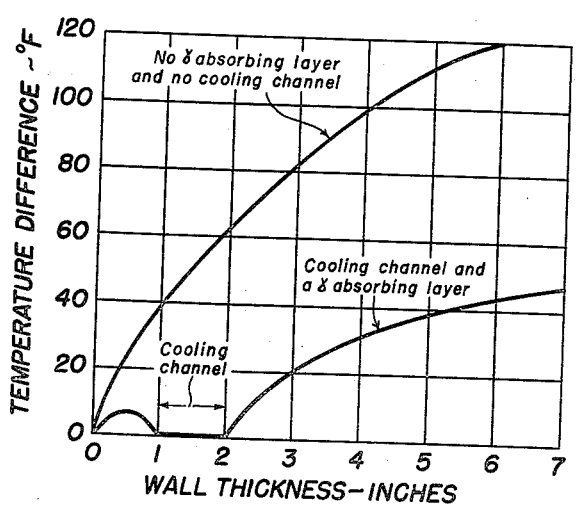
FIG. 5 is a graph comparing the temperature rise in the vessel wall shown in FIG. 3 with a conventional multi-layer vessel.

FIG. 5 is a graph comparing the calculated average temperature rise across the vessel wall of the invention which incorporates the gamma radiation absorption layer 14 and the cooling pasages 16 with that of a conventional multi-layer reactor vessel.

In calculating the curves in which the temperature drop was plotted against the reactor vessel thickness no internal shielding was included, the gamma radiation was calculated at the core horizontal midplane, and the thickness of both the conventional vessel wall, the vessel wall of the invention was assumed to be 7 inches and the gamma radiation absorbing layer was lead. In regard to the vessel of the invention, the innermost layer extending from 0 to 1 inch on the wall thickness scale was the gamma radiation absorbing layer 14 and the layer extending from 1 to 2 inches was the cooling passage 16. The remainder of the vessel wall from 2 inches to 7 inches on the wall thickness scale was the layer 15.

In regard to the conventional vessel, the wall included six superimposed metal layers corresponding generally to layers 15 of the invention and without a gamma absorbing layer and without the cooling passage.

As seen from the curves, the temperature in the conventional multi-layer vessel increased approximately 120° F. from the inside vessel wall surface to the outside vessel wall surface due to the absorption of gamma radiation within the wall. In contrast to this, the temperature increase from the inside of the vessel wall of the invention to the outside of the wall was only about 48° F., a substantial reduction from that of the conventional multi-layer vessel. The temperature increased abruptly in the 0 to ½ inch range of the vessel wall of the invention due to the absorption of gamma radiation, and then decreased abruptly from ½ to 1 inch due to the effect of the cooling medium in the cooling passages in the 1 to 2 inch range. The temperature again rose gradually from the 2 inch line to the outer surface of the vessel wall.

As a considerable amount of heat generated in the gamma radiation absorption layer 14 is removed by the cooling medium in passages 16, the remaining outer layers in the vessel wall have a substantially reduced temperature from that of the conventional vessel. The reduced temperature in the outer layers correspondingly reduces the thermal stresses set-up in these layers.

The present invention aids in controlling the location of the generation of heat within the reactor vessel wall due to the absorption of gamma radiation and reduces the thermal stresses in the vessel wall by locating the absorption layer adjacent a cooling passage or cooling surface.

While the above description is directed to the absorbing layer and cooling passages being associated with the cylindrical shell, it is contemplated that they may also be located in the heads or other portions of the vessel wall.

Various modes of carrying out the invention are contemplated as being within the scope of the following claims particularly pointion out and distinctly claiming the subject matter which is regarded as the invention.

We claim:

1. In a multi-layer vessel adapted to contain radioactive materials under high pressure and temperature, a wall section formed of a plurality of thin superimposed metallic layers disposed in tight engagement with each other, a gamma radiation absorbing layer disposed between two adjacent metallic layers and forming an integral part of said wall section, said gamma radiation absorbing layer being formed of a metallic material having a density greater than 8.0 grams per cubic centimeter and serving to absorb a substantial portion of the gamma radiation emitted by the radio-active materials and thereby control the distribution of the heat generated within said wall section by the absorption of said gamma radiation, and means for introducing a cooling medium into heat transfer relation with said absorbing layer to effect a transfer of heat from said absorbing layer to the cooling medium and thereby decrease the thermal stresses in the wall section.

2. In a multi-layer vessel adapted to contain radioactive materials under high pressure and temperature, a wall section formed of a plurality of thin superimposed cylindrical metallic layers disposed in tight contacting relation with each other and with each layer having substantially the same thickness and having a cooling passage disposed between two adjacent layers, means for circulating a cooling medium within said cooling passage, and a gamma radiation energy absorbing layer disposed within said wall section immediately adjacent said cooling passage, said absorbing layer being formed of a metallic material having a density greater than 8.0 grams per cubic centimeter and serving to absorb a substantial portion of the gamma radiation emitted by the radio-active materials and thereby control the distribution of the heat generated within said wall section by the absorption of said gamma radiation, and said heat being transferred to the cooling medium to thereby decrease the thermal stresses in the wall section.

3. In a multi-layer wall section for use in a pressure vessel adapted to contain radio-active materials, an innermost layer of a corrosion resistant material, a gamma radiation absorbing layer disposed outwardly adjacent said innermost layer and forming an integral part of said wall section, said gamma radiation absorbing layer being formed of a material having a density greater than 8.0 grams per cubic centimeter and serving to absorb a substantial portion of the gamma radiation emitted by the radio-active materials and thereby control the distribution of the heat generated within said wall section by the absorption of said gamma radiation, a series of spaced members disposed on the outer surface of said absorbing layer with the spaces between said members defining a series of cooling passages for the circulation of a cooling medium, means for introducing a cooling medium into said passages, and at least one metallic layer disposed outwardly of said members to provide the necessary physical properties for the multi-layer wall section, the heat generated in said absorbing layer by the absorption of gamma radiation being transferred to said cooling medium to thereby decrease the thermal stresses in the wall section.

4. The structure of claim 3 in which the innermost layer is formed of stainless steel and the metallic layer is formed of carbon steel.

5. A multi-layer pressure vessel adapted to contain radio-active materials under high pressure and temperature, comprising a wall section including a plurality of generally cylindrical thin metallic structural layers with each layer having substantially the same thickness and disposed in tight engagement with adjacent layers, each of said layers having a pair of substantially longitudinal edges, a weld joining the longitudinal edges of each of said layers, a gamma radiation energy absorbing layer disposed between two adjacent structural layers and forming an integral part of the wall section, said gamma ray absorbing layer being formed of a metallic material having a density greater than 8.0 grams per cubic centimeter and serving to absorb a substantial portion of the gamma radiation emitted by the radio-active materials to thereby control the distribution of the heat within the wall thickness by the absorption of said gamma radiation, and a head welded to each end of the wall section.

References Cited in the file of this patent

UNITED STATES PATENTS

| | | |
|---|---|---|
| 2,769,915 | Tittle | Nov. 6, 1956 |
| 2,853,624 | Wigner et al. | Sept. 23, 1958 |
| 2,874,307 | Wigner et al. | Feb. 17, 1959 |

OTHER REFERENCES

"Radiation Shielding," by Price, Horton and Spinney, chap. 6, pages 230 to 258; published by Pergamon Press, 122 East 55th Street, New York 22, N.Y., March 1957.